US010929852B2

(12) United States Patent
Howe

(10) Patent No.: US 10,929,852 B2
(45) Date of Patent: Feb. 23, 2021

(54) METHOD AND APPARATUS FOR OPTIMIZING AUTHORIZATION APPROVAL IN A PAYMENT CARD TRANSACTION

(71) Applicant: Justin Howe, San Francisco, CA (US)

(72) Inventor: Justin Howe, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 617 days.

(21) Appl. No.: 15/209,041

(22) Filed: Jul. 13, 2016

(65) Prior Publication Data

US 2018/0018667 A1    Jan. 18, 2018

(51) Int. Cl.
*G06Q 40/00* (2012.01)
*G06Q 20/40* (2012.01)
(Continued)

(52) U.S. Cl.
CPC ......... *G06Q 20/409* (2013.01); *G06Q 20/102* (2013.01); *G06Q 20/34* (2013.01); *G06Q 20/389* (2013.01); *G06Q 20/405* (2013.01)

(58) Field of Classification Search
CPC .... G06Q 40/00; G06Q 20/409; G06Q 20/102; G06Q 20/34; G06Q 20/389; G06Q 20/405
See application file for complete search history.

(56) References Cited

U.S. PATENT DOCUMENTS 8,768,838 B1 * 7/2014 Hoffman ............... G06Q 40/00
705/44
2004/0148255 A1 * 7/2004 Beck ...................... G06Q 10/02
705/39

(Continued)

FOREIGN PATENT DOCUMENTS

WO    2016084074 A1    6/2016

OTHER PUBLICATIONS

Tangible Change at Visa, MC: Flat Cards OKdBreitkopf, David. American Banker169.125: 8. SourceMedia, Inc. (Jun. 30, 2004) (Year: 2004).*
International Search Report and Written Opinion Issued in Corresponding International Patent Application No. PCT/US2017/041789, filed Jul. 12, 2017, 9 pages.
BlueSnap, How Things Work: Intelligent Payment Routing by Terry Monteith, Nov. 24, 2015, Retrieved on Sep. 7, 2017, Retrieved from the Internet <URL: https://home.bluesnap.com/snap-center/blog/how-things-work-intelligent-payment-routing/>.

(Continued)

*Primary Examiner* — Lalita M Hamilton
(74) *Attorney, Agent, or Firm* — Loeb & Loeb LLP

(57) ABSTRACT

A apparatus and method is disclosed for optimizing authorization approval in a proposed payment card transaction. In one embodiment an issuing country of the cardholder issuing bank is identified together with a plurality of potential merchant acquiring banks that could be used to process an authorization request for the proposed payment card transaction. Using historical data regarding previous proposed payment card transactions, historical approval rates are identified for each of the identified potential merchant acquiring bank configurations. The merchant acquiring bank configuration with the highest historical approval rating is selected as the optimal merchant bank configuration for processing authorization approval. To improve the ranking of a given configuration, the apparatus and method may exclude from consideration transactions that do not include: the specific bank identifying number (BIN) on the payment card, the collection of BINs belonging to the cardholder issuing bank, and/or the at least one merchant category code associated with the merchant.

15 Claims, 3 Drawing Sheets

(51) Int. Cl.
*G06Q 20/38* (2012.01)
*G06Q 20/10* (2012.01)
*G06Q 20/34* (2012.01)

(56) References Cited

U.S. PATENT DOCUMENTS

| | | | |
|---|---|---|---|
| 2004/0155101 A1* | 8/2004 | Royer | G06Q 20/04 235/379 |
| 2004/0167854 A1* | 8/2004 | Knowles | G06Q 20/105 705/41 |
| 2011/0282780 A1 | 11/2011 | French et al. | |
| 2012/0072347 A1 | 3/2012 | Conway | |
| 2014/0129435 A1* | 5/2014 | Pardo | G06Q 20/36 705/41 |
| 2014/0304158 A1 | 10/2014 | Basu et al. | |
| 2015/0317633 A1 | 11/2015 | Saunders et al. | |

OTHER PUBLICATIONS

International Search Report and Written Opinion for PCT/US2017/041789 dated Sep. 22, 2017, 13 pages.

\* cited by examiner

METHOD AND APPARATUS FOR OPTIMIZING AUTHORIZATION APPROVAL IN A PAYMENT CARD TRANSACTION

BACKGROUND

The present disclosure relates to payment card transaction systems, and more particularly to the authorization of a payment card in a proposed payment card transaction.

Payment card processing is ubiquitous in today's society. Payment cards such as credit cards and debit cards are issued by bank institutions called cardholder issuing banks. When presented for payment, a payment card enables its owner to make payment by electronic funds transfer. In the case of credit cards, the cardholder issuing bank may have extended the cardholder a line of credit as part of a revolving account against which the cardholder can borrow money for payment to a merchant or as a cash advance. In the case of a debit card, the cardholder issuing bank maintains funds that the cardholder has placed into a checking account or other similar account, from which the cardholder may make withdrawals, including withdrawals for payment to a merchant.

FIG. 1 depicts an exemplary schematic block diagram of a prior art authorization process 100 for an exemplary payment card transaction. Cardholder 102 may utilize a payment card to effectuate payment for goods and/or services offered for sale by a merchant by presenting the payment card to a merchant payment terminal 104. The merchant payment terminal 104 may be an internet website, a payment card reader such as a magnetic card reader or smart card reader (e.g., an EMV card reader or a contactless card reader) or a virtual wallet reader. Upon presentation of the physical or virtual payment card, account details (i.e., account number) are presented to the merchant. Ordinarily the merchant sends 126 those details to the merchant acquiring bank 108 with which it is affiliated. The merchant acquiring bank 108 communicates 128 with a card association authorization system 110 such as a Visa authorization system or MasterCard authorization system. The card association authorization system 110 checks the card security features, determines the cardholder's bank, and sends 130 the card details to the cardholder's issuing bank 112 for transaction approval. The cardholder issuing bank 112 then decides whether to approve the purchase and sends 130 its approval or decline back to the merchant acquiring bank 108. In turn, the merchant acquiring bank 108 sends 128 the approval or decline message back to the merchant. If approved, the cardholder 102 completes the purchase.

Many merchants have multiple merchant acquiring banks 108 associated with different countries. For example, certain merchants might handle certain purchases from American and Mexican cardholders in a U.S. merchant acquiring account, while purchases from U.K. cardholders may be held in a Luxembourg acquiring account. The motivations for such a set up may include:

1. Minimization of corporate tax rate by keeping revenues out of the United States. Funds that are not repatriated enable the postponement of American taxes; and 2. Avoiding currency conversion fees for cardholders who may not react well to additional line items in their bank statement for currency fees.

At present, the determination of which merchant acquiring bank 108 is utilized during the authorization process is determined solely by the cardholder issuing country (i.e., the country of the cardholder issuing bank 112), without regard to transaction-particular authorization approval rates. Because a cardholder's issuing country determines which merchant acquiring bank 108 is utilized, a need exists for a more intelligent manner of determining which merchant acquiring bank 108 should be utilized to maximize or optimize approval rates for a given transaction. The present disclosure fulfills this and other needs.

SUMMARY

A method and apparatus are disclosed that optimize authorization approval in a proposed payment card transaction. In one embodiment, upon presentation of a payment card for a proposed payment card transaction, e.g., presentation of a credit card to a merchant point of sale payment terminal, an issuing country determination module may determine an issuing country of the cardholder issuing bank. The issuing country is determined based on a bank identification number (BIN) associated with the payment card. The BIN uniquely identifies the cardholder issuing bank and generally comprises the first six digits of the payment card number. A potential merchant country determination module may determine, identify, or otherwise uncover a number of merchant countries that could be used as part of the authorization process. In one embodiment, the uncovered plurality of potential merchant countries are those countries with which the cardholder issuing bank has previously made at least one payment card transaction. These merchant countries may be determined using the BIN as an index into a database that stores this information.

After identifying the issuing country and a list of merchant countries that have previously contacted the cardholder issuing bank for authorization of a proposed payment card transactions, an authorization approval optimization module may identify and rank authorization rates for each merchant country on a per merchant country basis to determine the optimal merchant country to use for obtaining authorization of the proposed payment transaction. In one embodiment, the authorization rates are based on aggregate approval statistics for that issuing country. By ranking historical authorization rates for past transactions involving the issuing country on a merchant country basis, the correct merchant country and thus merchant acquiring bank can be selected to optimize the approval of the proposed payment transaction.

In another embodiment, the authorization approval optimization module may interrogate the authorization rates to exclude from consideration any transactions that did not include the payment card BIN. In yet another embodiment, if there are no such transactions that include the payment card BIN, then the authorization approval optimization module may interrogate the authorization rates to exclude from consideration any transactions that do not include a BIN associated with the cardholder issuing bank. By excluding from the above-described ranking transaction data that is not related to the specific cardholder issuing bank (using BIN information), the optimization may be improved.

In another embodiment, the merchant category code ("MCC") can be discerned from the merchant using an MCC determination module. Once identified, in one embodiment, the authorization approval optimization module may further exclude from consideration any transactions that did not include the same MCC as the merchant. By excluding from the above-described ranking transaction data that is not related to the specific merchant (using MCC information), the optimization may again be improved.

Finally, the rankings can be adjusted to account for the sample size of the historical transaction data. For example, if the approval rate for a given merchant country is 90% but only had five transactions from which that approval rate was derived, it may be adjusted downward relative to a merchant country approval rate of 85% over a much larger pool of transactions.

BRIEF DESCRIPTIONS OF THE DRAWINGS

The detailed description refers to the following Figures in which.

DETAILED DESCRIPTION

Figure 1:
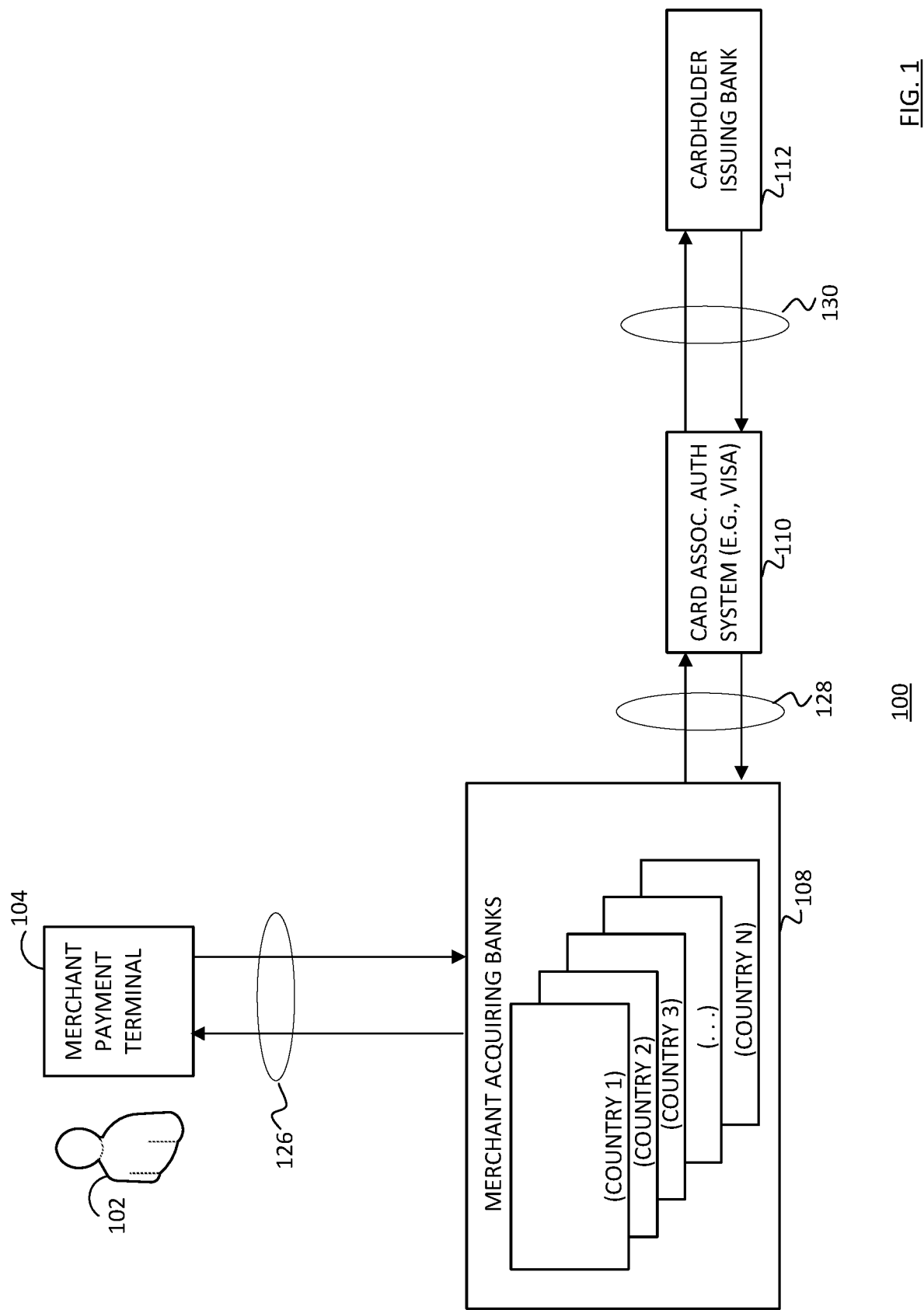
FIG. 1 is a schematic block diagram of a prior art authorization process in an exemplary payment card transaction.
Figure 2:
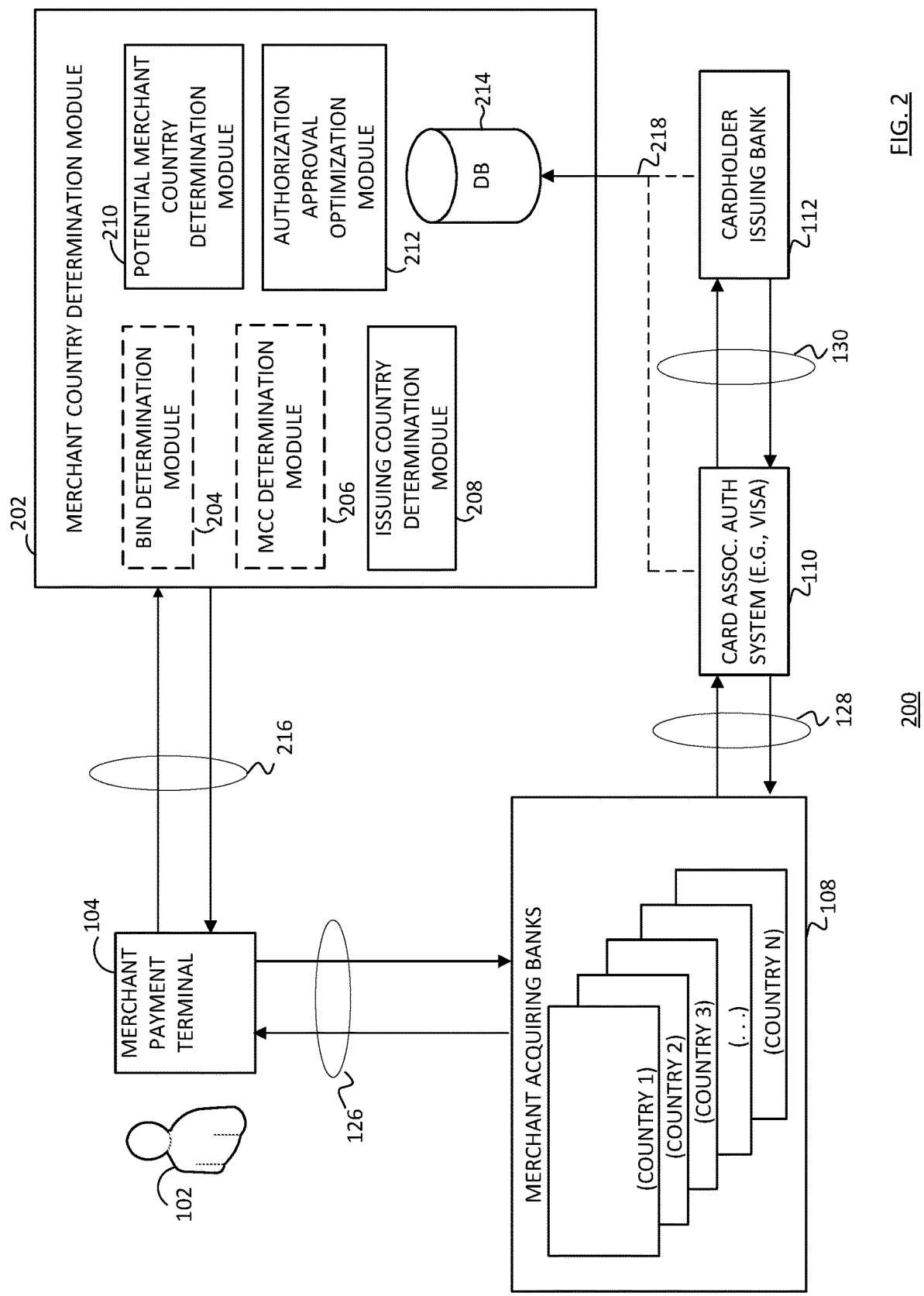
FIG. 2 is a schematic block diagram of the authorization process in an exemplary payment card transaction including a merchant country determination module as described in the present disclosure.

FIG. 2 is a schematic block diagram of the authorization process 200 for an exemplary payment card transaction incorporating a merchant country determination module 202 of the present disclosure. Merchant country determination module 202 is in operable communication 216 with merchant payment terminal 104. In one embodiment, merchant country determination module includes an issuing country determination module 208, a potential merchant country determination module 210, authorization approval optimization module 212, and database 214. Upon a user 102 presentation of a payment card to merchant payment terminal 104, merchant payment terminal 104 may provide 216 payment card number information to authorization merchant country determination module 202.

Figure 3:
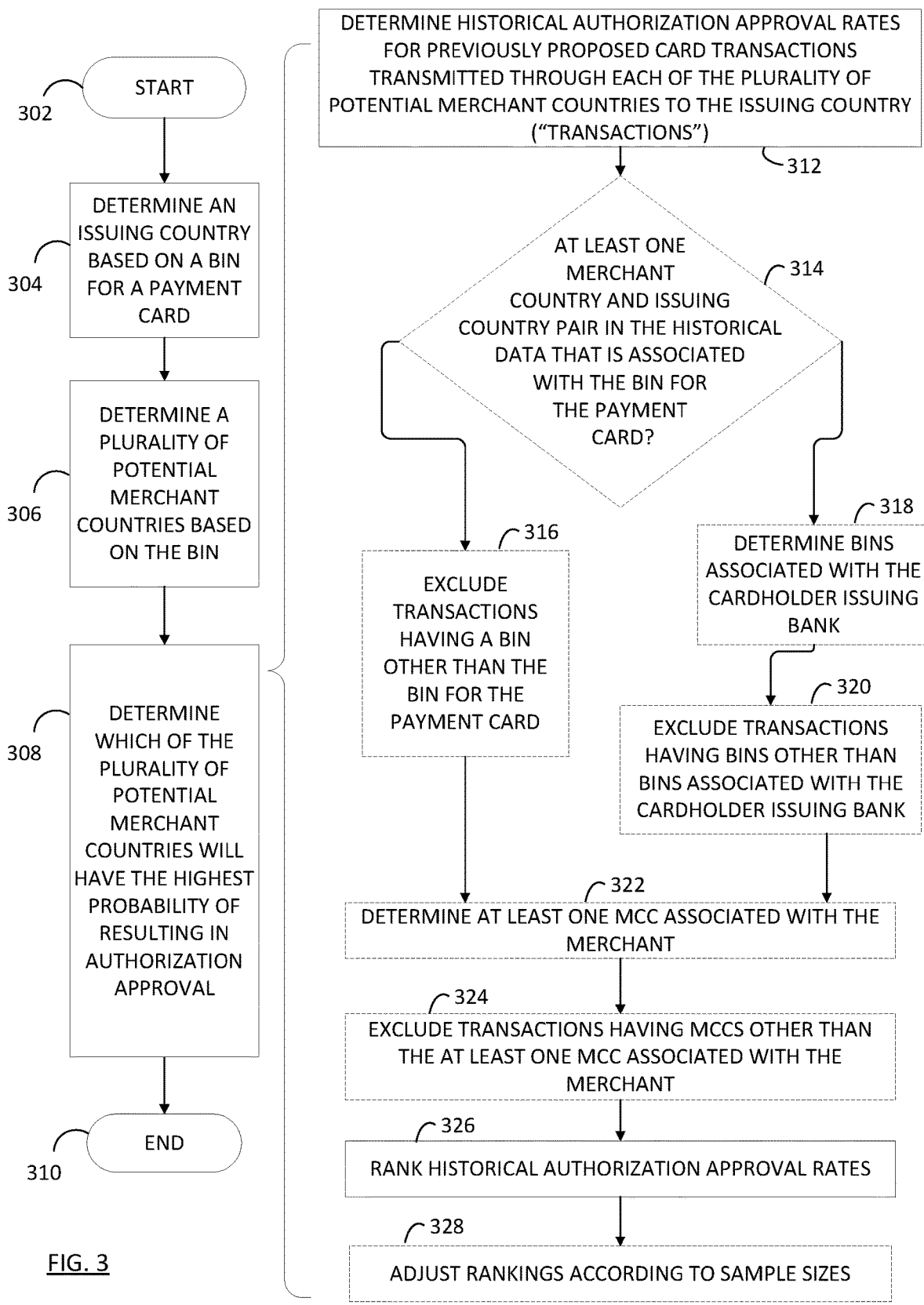
FIG. 3 is a flow chart illustrating an exemplary method of using the merchant country determination module of FIG. 1 in accordance with one embodiment of the present disclosure.

With reference to FIG. 3, a flowchart illustrating an exemplary method 300 of using merchant country determination module 202, the provision 216 of payment card number to the merchant country determination module 202 by merchant payment terminal 104 may be associated with start block 302. The process may continue in block 304 where an issuing country (i.e., the country associated with cardholder issuing bank 112) is determined based on a bank identification number ("BIN") for a payment card. Those with ordinary skill in the art will appreciate that the BIN is ordinarily the first six digits of the payment card number. If not parsed by the merchant payment terminal 104, the BIN may be determined by optional BIN determination module 204. Block 304 may in one embodiment be performed by issuing country determination module 208. The issuing country determination module 208 may determine the issuing country by querying database 214 using BIN.

The method continues in block 306 where a plurality of potential merchant countries is determined based on the BIN. In one embodiment, that determination may be made by potential merchant country determination module 210. The plurality of potential merchant countries includes two or more merchant countries with which the cardholder issuing bank 112 has previously made at least one payment card transaction. In one embodiment, potential merchant country determination module 210 may query database 214 to ascertain the identity of such potential merchant countries. The method then continues in block 308 where it is determined which of the plurality of potential merchant countries will, if selected for use in the proposed payment card transaction, yield the highest probability of authorization approval for the proposed transaction. Generally, authorization approval optimization module 212 performs this process by ranking each of the plurality of potential merchant countries using historical authorization approval rates. For example, database 214 may be queried by authorization approval optimization module 212 to look up authorized approval rates for previously proposed card transactions transmitted through each of the plurality of potential merchant countries to the issuing country associated with the cardholder issuing bank 112.

In one embodiment method block 308 may include method blocks 312-328. In block 312, historical authorization approval rates for previously proposed card transactions transmitted through each of the plurality of potential merchant countries to the issuing country of the cardholder issuing bank 112 (hereinafter "Transactions") is determined, uncovered, or otherwise identified in block 312. As explained above, authorization approval optimization module 212 may perform this step by querying database 214. In one embodiment the method continues in block 326 where the historical authorization approval rates are ranked to determine which of the plurality of potential merchant countries will, if used in the authorization process, yield the highest probability of authorization approval.

In one embodiment, optional decision block 314 is performed by authorization approval optimization module 212 to determine whether there is at least one merchant country and issuing country pair in the historical data that is associated with the BIN for the payment card. If there is one such pair present in the historical data, then the method continues in optional block 316 where Transactions having a BIN other than the BIN for the payment card are excluded from consideration in the above-described ranking. If, however, there are no such pairs in the historical data, then the method may continue in optional block 318 where a plurality (preferably all known) BINs associated with the cardholder issuing bank are determined, uncovered, or otherwise identified. Again, as one of ordinary skill in the art will one appreciate, such a determination may be made by authorization approval optimization module 212 by querying database 214. The method may then continue in optional block 320 where Transactions having BINs other than the BINs associated with the cardholder issuing bank are excluded from consideration in the above-described ranking. Upon excluding Transactions having certain BINs in optional blocks 316 or 320, the method may continue in block 326, as described above, or may alternatively continue in optional block 322.

In optional block 322, optional merchant category code (MCC) determination module 206 may determine at least one MCC associated with the merchant. As those with skill in the art will recognize, merchants may have one or more MCCs based upon the types of goods or services with which they provide. For example, a hypermarket may have multiple MCCs associated with their wide range of product and service offerings (e.g., pharmacy, optical, supermarket, gas/petrol, etc.). The method may continue in optional block 324 where authorization approval optimization module 212 excludes, from consideration in the above-described ranking, Transactions having MCCs other than the at least one MCC associated with the merchant. The method may then continue in block 326 where resulting historical authorization approval rates are ranked. Finally, in optional block 328, authorization approval optimization module 212 may optionally adjust the rankings according to sample sizes of data stored in the historical authorization approval rates. For example, if the approval rate for a given merchant country is 90% but only had five transactions from which that approval rate was derived, it may be adjusted downward relative to a merchant country approval rate of 85% over a much larger pool of transactions. In one embodiment, a weighting factor may be applied to the ranking for a given merchant country corresponding to a relationship (e.g., a ratio) between (a) the number of previously proposed Transactions with the issuing countries that are associated with that merchant countries; and (b) the sum of the number of all previously proposed Transactions associated with all merchant countries. In one embodiment, the lower bound of the Wilson score interval is used as the weighing factor. One of skill in the art will recognize that other weighting factors may be applied.

Each of the modules comprising merchant country determination module 202 may consult database 214, as described above. One with skill in the art may appreciate that in one embodiment, card association authorization system 110 and/or cardholder issuing bank 112 may supply 218 the data stored in database 214 to further the goals of the present disclosure.

As a result of the method and system, a technical problem of optimizing authorization approval in a proposed payment process may be addressed by changing the conventional way that merchant acquiring banks are configured for involvement in the authorization aspects of a payment card transaction. By identifying past authorization approval rates for a plurality of potential merchant bank configurations who are capable of handling the authorization request using at least issuing country of the cardholder issuing bank, the merchant acquiring bank configuration with the highest probability of resulting in authorization approval can be identified. The optimization may be improved by filtering from consideration any past authorization approval rates that are not tied to the specific cardholder issuing bank (using one or more BINs) and the type of merchant (using one or more MCCs). As a result, payment card approval authorization may be drastically increased while providing customization to BIN-specific issuers.

As used herein, the following terms have the meanings described thereto as set forth below. "Module" may refer to any single or collection of circuit(s), integrated circuit(s), processor(s), processing device(s), transistor(s), memory(s), storage(s), computer readable medium(s), combination logic circuit(s), or any combination of the above that is capable of providing a desired operation(s) or function(s). For example, a "module" may take the form of a processor executing instructions from memory, storage, or computer readable media, or a dedicated integrated circuit. "Memory," "computer-readable media," and "storage" may refer to any suitable internal or external volatile or non-volatile, memory device, memory chip(s), or storage device or chip(s) such as, but not limited to system memory, frame buffer memory, flash memory, random access memory (RAM), read only memory (ROM), a register, a latch, or any combination of the above. A "processor" may refer to one or more dedicated or non-dedicated: micro-processors, micro-controllers, sequencers, micro-sequencers, digital signal processors, processing engines, hardware accelerators, applications specific circuits (ASICs), state machines, programmable logic arrays, any integrated circuit(s), discreet circuit(s), etc. that is/are capable of processing data or information, or any suitable combination(s) thereof. A "processing device" may refer to any number of physical devices that is/are capable of processing (e.g., performing a variety of operations on) information (e.g., information in the form of binary data or carried/represented by any suitable media signal, etc.). For example, a processing device may be a processor capable of executing executable instructions, a desktop computer, a laptop computer, a mobile device, a hand-held device, a server (e.g., a file server, a web server, a program server, or any other server), any other computer, etc. or any combination of the above. An example of a processing device may be a device that includes one or more integrated circuits comprising transistors that are programmed or configured to perform a particular task. "Executable instructions" may refer to software, firmware, programs, instructions or any other suitable instructions or commands capable of being processed by a suitable processor.

What is claimed:

1. A apparatus for optimizing authorization approval in a proposed payment card transaction, the apparatus comprising:
    an issuing country determination module operative to determine an issuing country based on a bank identification number (BIN) for a payment card presented to a merchant in the proposed payment transaction, wherein the BIN identifies a specific cardholder issuing bank that issued the payment card presented in the proposed payment transaction, and wherein the issuing country is a predetermined country associated with cardholder issuing bank;
    a potential merchant country determination module operative to determine a plurality of potential merchant countries based on the BIN, wherein the plurality of potential merchant countries includes two or more merchant countries with which the cardholder issuing bank has previously made at least one payment card transaction; and
    an authorization approval optimization module operative to:
        determine which of the plurality of potential merchant countries will, if selected for use in the proposed payment card transaction, have the highest probability of resulting in authorization approval by ranking each of the plurality of potential merchant countries using historical authorization approval rates for previously proposed card transactions transmitted through each of the plurality of potential merchant countries to the issuing country, wherein using historical authorization approval rates includes filtering, by the authorization approval optimization module, the historical authorization approval rates for previously proposed card transactions to exclude previously proposed card transactions having a BIN other than the BIN for the payment card, and
        cause a merchant payment terminal associated with the merchant to select for use in the proposed payment card transaction the merchant acquiring bank determined to have the highest probability of resulting in authorization approval;
    wherein each of the modules is implemented using at least one of: a circuit, an integrated circuit, a hardware processor, a processing device, a transistor, a memory, a non-transitory computer readable medium, and a combination logic circuit.

2. The apparatus of claim 1, wherein the authorization approval optimization module is further operative to filter the historical authorization approval rates for previously proposed card transactions to exclude previously proposed card transactions having BINs other than BINs associated with the cardholder issuing bank.

3. The apparatus of claim 1, further comprising a BIN determination module operative to determine the BIN for the payment card presented based on a payment card number.

4. The apparatus of claim 1, further comprising a merchant category code (MCC) determination module operative to determine at least one MCC associated with the merchant.

5. The apparatus of claim 4, wherein the authorization approval optimization module is further operative to filter the historical authorization approval rates for previously proposed card transactions to exclude previously proposed card transactions having MCCs other than the at least one MCC associated with the merchant.

6. The apparatus of claim 1, wherein the authorization approval rate optimization module is further operative to adjust the ranking for each of the plurality of potential merchant countries based on a weighting factor, wherein each weighting factor corresponds to a relationship between (a) a number of previously proposed transactions transmitted through each of the plurality of potential merchant countries to the issuing country and (b) a sum of a number of all previously proposed transactions through all of the plurality of potential merchant countries to the issuing country.

7. A method for optimizing authorization approval in a proposed payment card transaction, the method comprising:
    determining, by an issuing country determination module, an issuing country based on a bank identification number (BIN) for a payment card presented to a merchant in the proposed payment transaction, wherein the BIN identifies a specific cardholder issuing bank that issued the payment card presented in the proposed payment transaction, and wherein the issuing country is a predetermined country associated with cardholder issuing bank;
    determining, by a potential merchant country determination module, a plurality of potential merchant countries based on the BIN, wherein the plurality of potential merchant countries includes two or more merchant countries with which the cardholder issuing bank has previously made at least one payment card transaction;
    determining, by an authorization approval optimization module, which of the plurality of potential merchant countries will, if selected for use in the proposed payment card transaction, have the highest probability of resulting in authorization approval by ranking each of the plurality of potential merchant countries using historical authorization approval rates for previously proposed card transactions transmitted through each of the plurality of potential merchant countries to the issuing country, wherein using historical authorization approval rates includes filtering, by the authorization approval optimization module, the historical authorization approval rates for previously proposed card transactions to exclude previously proposed card transactions having a BIN other than the BIN for the payment card; and
    causing, by the authorization approval optimization module, a merchant payment terminal associated with the merchant to select for use in the proposed payment card transaction the merchant acquiring bank determined to have the highest probability of resulting in authorization approval.

8. The method of claim 7, further comprising filtering, by the authorization approval optimization module, the historical authorization approval rates for previously proposed card transactions to exclude previously proposed card transactions having BINs other than BINs associated with the cardholder issuing bank.

9. The method of claim 7, further comprising determining, by a BIN determination module, the BIN for the payment card presented based on a payment card number.

10. The method of claim 7, further comprising determining, by a merchant category code (MCC) determination module, at least one MCC associated with the merchant.

11. The method of claim 10, further comprising filtering, by the authorization approval optimization module, the historical authorization approval rates for previously proposed card transactions to exclude previously proposed card transactions having MCCs other than the at least one MCC associated with the merchant.

12. A tangible non-transitory computer readable medium including executable instructions stored thereon comprising issuing country determination instructions, potential merchant country determination instructions, and authorization approval optimization instructions, such that when executed by a processor, enable the processor to perform a method for optimizing authorization approval in a proposed payment card transaction, the method comprising:
    determining, by execution of the issuing country determination instructions, an issuing country based on a bank identification number (BIN) for a payment card presented to a merchant in the proposed payment transaction, wherein the BIN identifies a specific cardholder issuing bank that issued the payment card presented in the proposed payment transaction, and wherein the issuing country is a predetermined country associated with cardholder issuing bank;
    determining, by execution of the potential merchant country determination instructions, a plurality of potential merchant countries based on the BIN, wherein the plurality of potential merchant countries includes two or more merchant countries with which the cardholder issuing bank has previously made at least one payment card transaction;
    determining, by execution of the authorization approval optimization instructions, which of the plurality of potential merchant countries will, if selected for use in the proposed payment card transaction, have the highest probability of resulting in authorization approval by ranking each of the plurality of potential merchant countries using historical authorization approval rates for previously proposed card transactions transmitted through each of the plurality of potential merchant countries to the issuing country, wherein using historical authorization approval rates includes filtering, by execution of the authorization approval optimization instructions, the historical authorization approval rates for previously proposed card transactions to exclude previously proposed card transactions having a BIN other than the BIN for the payment card; and
    causing, also by execution of the authorization approval optimization instructions, a merchant payment terminal associated with the merchant to select for use in the proposed payment card transaction the merchant acquiring bank determined to have the highest probability of resulting in authorization approval.

13. The tangible non-transitory computer readable medium of claim 12, wherein the method further comprising filtering, by execution of the authorization approval optimization instructions, the historical authorization approval rates for previously proposed card transactions to exclude previously proposed card transactions having BINs other than BINs associated with the cardholder issuing bank.

14. The tangible non-transitory computer readable medium of claim 12, wherein the executable instructions stored thereon further comprise BIN determination instructions, the method further comprising determining, by execution of the BIN determination instructions, at least one MCC associated with the merchant.

15. The tangible non-transitory computer readable medium of claim 14, wherein the method further comprises filtering, by execution of the authorization approval optimization instructions, the historical authorization approval rates for previously proposed card transactions to exclude previously proposed card transactions having MCCs other than then at least one MCC associated with the merchant.

\* \* \* \* \*